United States Patent
Conradt et al.

(10) Patent No.: US 6,508,504 B1
(45) Date of Patent: Jan. 21, 2003

(54) ADJUSTABLE FLAP IN THE COVERING OF A VEHICLE

(75) Inventors: Holger Conradt, Markgröningen (DE); Carsten Eidmann, Hemmingen (DE); Jan Just, Tübingen (DE); Frank Rose, Kirchhardt-Berwang (DE)

(73) Assignee: CTS Fahrzeug Dachsysteme GmbH, Korntal-Muenchingen (DE)

( * ) Notice: Subject to any disclaimer, the term of this patent is extended or adjusted under 35 U.S.C. 154(b) by 0 days.

(21) Appl. No.: 09/722,025

(22) Filed: Nov. 27, 2000

(30) Foreign Application Priority Data

Nov. 26, 1999 (DE) .......................................... 199 56 882

(51) Int. Cl.$^7$ ................................................. B60J 7/20
(52) U.S. Cl. .................. 296/136; 296/107; 296/107.08; 296/117
(58) Field of Search ........................... 296/136, 107.08, 296/117, 146

(56) References Cited

U.S. PATENT DOCUMENTS

| | | | | | |
|---|---|---|---|---|---|
| 3,575,464 A | * | 4/1971 | Himka et al. | ................ | 296/117 |
| 4,512,606 A | * | 4/1985 | Trostle et al. | ................ | 296/136 |
| 4,566,728 A | * | 1/1986 | Theodore | .................... | 296/146 |
| 4,600,233 A | * | 7/1986 | Boydston | ................... | 296/136 |
| 4,687,247 A | * | 8/1987 | Muscat | ........................ | 296/136 |
| 4,746,163 A | * | 5/1988 | Muscat | ........................ | 296/136 |
| 5,090,764 A | | 2/1992 | Kogawa et al. | ............. | 296/107 |
| 5,558,389 A | * | 9/1996 | Rothe et al. | ................ | 296/136 |
| 5,573,296 A | * | 11/1996 | Lienenkamp | ................ | 296/136 |
| 5,743,587 A | * | 4/1998 | Alexander et al. | ........... | 296/136 |
| 5,769,483 A | * | 6/1998 | Danzl et al. | ................. | 296/107 |
| 5,810,422 A | * | 9/1998 | Corder et al. | ................ | 296/136 |
| 5,921,608 A | * | 7/1999 | Schnitt et al. | .......... | 296/107.08 |
| 5,967,593 A | * | 10/1999 | Schuler et al. | .............. | 296/136 |
| 6,039,382 A | * | 3/2000 | Mather et al. | .......... | 296/107.08 |
| 6,168,224 B1 | | 1/2001 | Henn et al. | ................. | 296/136 |
| 6,193,300 B1 | * | 2/2001 | Nakatomi et al. | ...... | 296/107.08 |
| 6,217,104 B1 | * | 4/2001 | Neubrand | .............. | 296/107.08 |
| 6,299,233 B1 | * | 10/2001 | Mentink | ..................... | 296/117 |

FOREIGN PATENT DOCUMENTS

| | | |
|---|---|---|
| DE | 36 23 468 C2 | 1/1987 |
| DE | 42 32 147 C1 | 9/1993 |
| DE | 195 18 071 A1 | 11/1996 |
| DE | 196 50 402 A1 | 6/1998 |
| DE | 19712967 | 10/1998 |
| DE | 19538738 | 7/1999 |

OTHER PUBLICATIONS

Copy of the Search Report.

* cited by examiner

*Primary Examiner*—Kiran Patel
(74) *Attorney, Agent, or Firm*—Crowell & Moring LLP

(57) ABSTRACT

A flap in the covering of a vehicle can be adjusted by flap kinematics between a closed position, in which the flap is situated essentially in the plane of the vehicle covering, and an opening position. In an operationally reliable construction, a vehicle-fixed link path for the passive guidance of a first guiding lever, which connects the flap with the vehicle, is provided in the lateral area of the flap. In the opposite lateral area of the flap, a second, actively guided guiding lever is arranged which is acted upon by a motor-driven actuator.

13 Claims, 2 Drawing Sheets

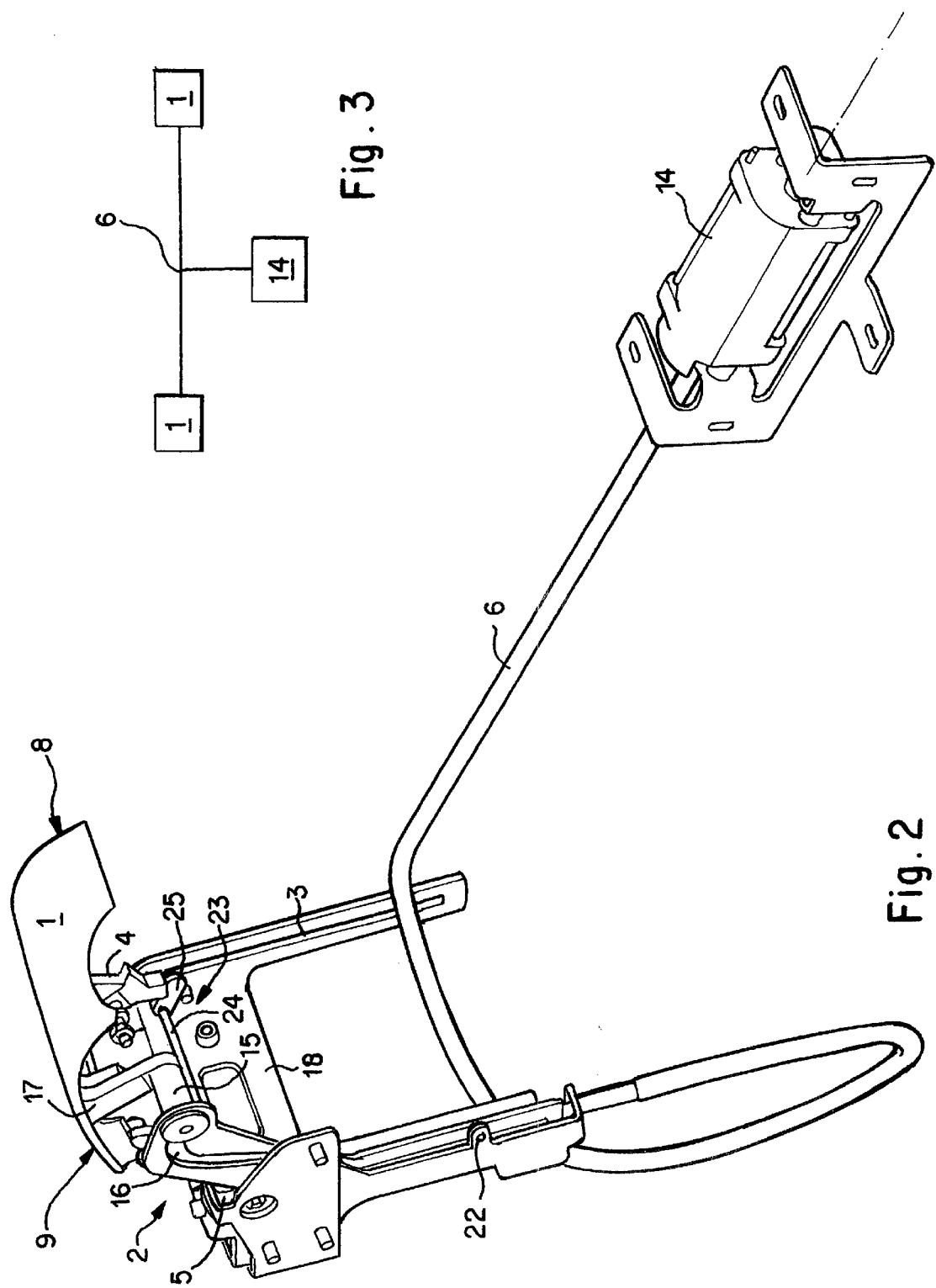

ADJUSTABLE FLAP IN THE COVERING OF A VEHICLE

The invention relates to an adjustable flap in the covering of a vehicle.

BACKGROUND OF THE INVENTION

This application claims the priority of German application No. 199 56 822.0, filed Nov. 26, 1999, the disclosure of which is expressly incorporated by reference herein.

The present invention relates to an adjustable flap in the covering of a vehicle for covering the convertible top kinematics of a convertible vehicle top which can be adjusted between a convertible top position and a deposited position, the flap being adjustable by means of flap kinematics between a closed position, in which the flap is situated in the plane of the vehicle covering, and an opening position.

Flaps of this general type are used, for example, in convertible vehicles in order to cover the adjusting kinematics of the adjustable vehicle roof in the closed and in the deposited position and to expose them during the transition movement between the closed and the deposited position in order to permit an unhindered adjusting movement. The vehicle flaps are integrated in the covering of the vehicle and, in the closed and opening position of the vehicle roof, are situated approximately in one plane with the vehicle covering.

As a general rule, the flaps are swivellably held on the covering and, during the adjusting movement of the vehicle roof, swivel open toward the outside, whereby the adjusting kinematics are exposed toward outside. The flaps are normally actuated only mechanically in that, after a triggering of the adjusting movement of the vehicle roof, the adjusting kinematics or an additional component to be assigned to the vehicle roof, which is arranged below the flap and is covered by it, pushes the flap open toward the outside. After the conclusion of the adjusting movement and after the convertible top has taken up its final position, the flap is returned to its closed position by a spring.

For reasons of convenience or comfort, nowadays, motor-driven convertible vehicle tops are normally used which are to be adjusted between the closed and deposited position by an electric motor. Although, also in the case of motor-driven convertible vehicle tops, the flaps can be actuated purely mechanically in the above-described manner, for reasons of a greater versatility and a broader usability, it is endeavored to provide also the flaps with an independent motor drive. Thereby, a kinematic coupling between the convertible top kinematics or a component connected therewith and the flap can be eliminated. However, because of the limited available space, a small construction is important in the case of motor drives for the flaps without limiting the reliability and operability of the flap movement.

DE 195 18 071 A1 discloses an actuating device for a convertible top and a convertible top compartment lid of a motor vehicle. The convertible top compartment lid is to be acted upon by an adjusting device which has a guiding arm on each longitudinal side of the convertible top compartment lid, so that the convertible top compartment lid is acted upon by a motor on two sides. Lids which are acted upon on both sides lower the risk of a jamming than lids which are driven only on one side because the driving forces are uniformly distributed over the length and the width of the acted-upon flap or lid. However, a motor drive on both sides requires considerably higher constructive expenditures and a relatively large space.

A motor drive of a convertible top compartment lid on both sides is disclosed in DE 196 50 402 A1. Concerning additional prior art, reference is also made to DE 36 23 468 C2 and DE 42 32 147 C1.

SUMMARY OF THE INVENTION

An object of the present invention is to provide an adjustable flap in the covering of a vehicle which, while its construction is small, has a high durability.

According to the present invention, this object has been achieved by in the lateral area of the flap, a vehicle-fixed link path is provided for the passive guidance of a first guiding lever connecting the flap with the vehicle, and in that, in the opposite lateral area of the flap, a second, actively guided guiding lever is arranged which is acted upon by a motor-driven actuator, a locking lever between the two guiding levers, in the closed position of the flap, being supported on the actively guided guiding lever and blocking the movement of the passively guided guiding lever.

The novel flap in the covering of the vehicle has a motor drive which, however, acts upon the flap only in the area of the lateral guidance in the lateral area of the flap. In order to avoid a jamming of the flap because of an eccentric admission of force and to ensure that the flap can carry out the adjusting movement for a long operating period without any problems, a vehicle-fixed link path is provided on the side of the flap situated opposite the motor drive. In the link path, a guiding lever engages and is connected with the flap, the guiding link being passively guided in the link path. As a result, the flap is actively guided in one of its lateral areas and is passively guided in the opposite lateral area. The double guiding in the lateral areas of the flap prevents jamming, so that operability is ensured for an extended operating time.

Another advantage of this construction is that additional possibilities exist in view of the installation position of the flap in the vehicle. That is, in principle, the motor drive can engage on each of the two flap sides without any impairment of the moving behavior. As a result, in a preferred embodiment a common motor drive can adjust two flaps in the area of opposite vehicle sides which have a symmetrical construction with respect to the longitudinal center plane of the vehicle.

Furthermore, a locking lever connects the two guiding levers on opposite lateral areas of the flap in the closed position and is supported on the actively guided guiding lever to block the movement of the passively guided guiding lever. As a result, it is achieved that, in the closed position, the flap is uniformly secured against an unintentional adjusting movement in the direction of its opening position caused by the effect of external force. In the area of the actively guided guiding lever, a locking takes place by the motor-driven actuator; whereas, in the opposite lateral area, the passively guided guiding lever, in the closed position, experiences a support by way of the locking lever which, in the closed position, connects the two guiding levers with one another.

In an advantageous further development, the locking lever has one locking element respectively in the area of its two faces. That is, the locking element, on the actively driven side of the flap, rests above the motor driven actuator and, on the passively guided side, supports from below the guiding lever existing there.

Preferably, a second vehicle-fixed link path is arranged at a distance from the first link path as viewed in the adjusting direction of the flap. A link pin fastened on the flap is guided in the second link path and thereby supports the lateral section of the flap opposite the application point of the two guiding levers. Thereby, the flap experiences an upper as well as a lower support or guidance in the adjusting direction. The second link path has an advantageously curved course which can be adapted to the respective constructional situations. Particularly in the area of the end sections of the second link path, detent positions are constructed for the engaging link pin in order to ensure that the flap can be locked in its closed position as well as in its opening position and maintain the respective end position also without jamming or support by other components.

In order to promote a return of the flap from the opening position back into the closed position, a disengaging lever is advantageously provided which is swivellably fastened on the vehicle and which, in the opening position of the flap, receives the link pin in a supporting manner. The disengaging lever is spring-loaded in the direction of the closed position of the flaps so that, even during a slight movement, triggered by the motor-driven actuator, in the direction of the closed position, the link pin in the link path is acted upon in the direction of the closed position. In this case, the link pin experiences an initial impulse.

BRIEF DESCRIPTION OF THE DRAWINGS

Other objects, advantages and novel features of the present invention will become apparent from the following detailed description of the invention when considered in conjunction with the accompanying drawings.

FIG. 2 is a perspective view of a flap which is mirror-symmetrically constructed with respect to the flap illustrated in FIG. 1, but in the assembled position.

FIG. 3 is a schematic view showing two flaps provided on each side of a vehicle and sharing a motor drive.

DETAILED DESCRIPTION OF THE PREFERRED EMBODIMENT

Figure 1:
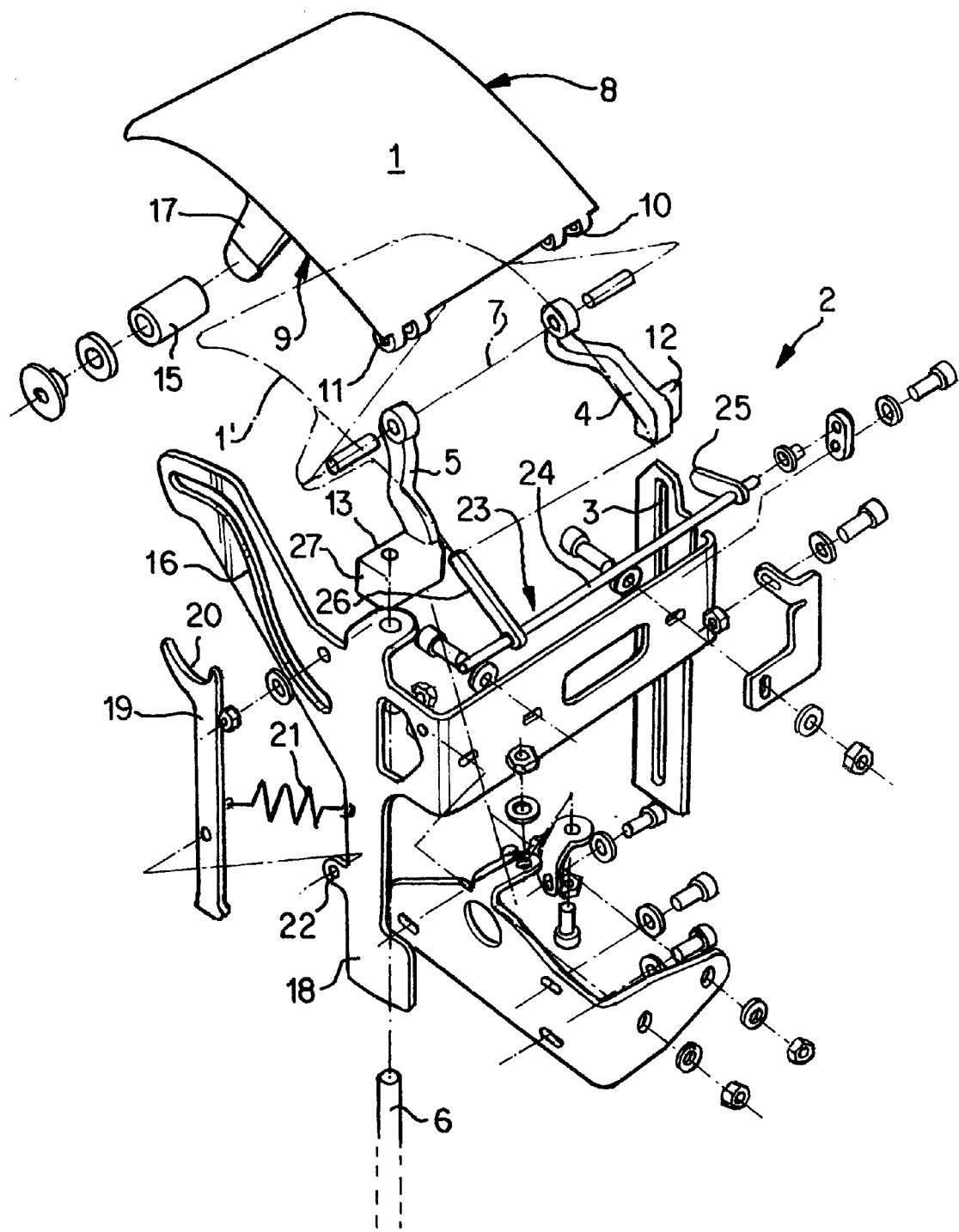
FIG. 1 is an exploded perspective view of the flap according to the invention.

In the case of the flaps illustrated in FIGS. 1 and 2, identical components have the same reference numbers.

The illustrated flap 1 is an adjusting flap which is arranged in the covering of a vehicle, particularly a covering flap for covering the convertible top kinematics of an adjustable convertible vehicle top, which can be adjusted between a convertible top position and a deposited position. Preferably two covering flaps are provided in the opposed lateral area of the vehicle, for example, in the area of a rollover bar of the vehicle.

The flap 1 can be adjusted between the closed position illustrated in FIGS. 1 and 2, in which the flap is integrated in the surrounding vehicle covering and is essentially situated in the plane of the surrounding covering, and an opening position 1' (dashed line in FIG. 1), in which the flap exposes an opening of the vehicle covering, particularly, in order to expose adjusting kinematics of a convertible vehicle top which are situated underneath. In the opening position, the flap is advantageously lowered under the surrounding vehicle covering and is situated approximately parallel to the vehicle covering.

The flap kinematics 2, by way of which the transition movement between the closed position and the opening position is to be carried out, comprises as essential components a link path 3, which in the embodiment extends approximately vertically and in which a first passive guiding level 4 engages; a second active guiding lever 5 and a motor-driven actuator 6. The link path 3 and the passive first guiding lever 4 are arranged in the area of a side 8 of the vehicle flap; the active second guiding lever 5 and the motor-driven actuator 6 are arranged in the area of the opposite side 9 of the flap 1. On the flap side, the two guiding levers 4, 5 have a common rotation axis 7 which extends transversely to the link path 3. On the flap side, the two guiding levers 4, 5 on the respective sides 8, 9 of the flap 1 are received in bearings 10, 11.

On the side opposite the flap-side bearing 10, the passive guiding lever 4 has a lateral projection 12 which projects into the link path 3 and provides a secure guidance in the link path. The opposite active guiding lever 5 can also be guided in a link path. However, the guiding lever 5 is actively driven by way of the motor-driven actuator 6 shown in FIG. 2. The two guiding levers 4, 5 carry out an isochronous homogeneous movement in the same direction. The active guiding lever 5 has a receiving device 13 in a projection 27 into which the motor-driven actuator 6 projects for transmitting the movement of the actuator 6. In the illustrated embodiment in FIG. 2, the motor-driven actuator 6 is constructed as a flexible shaft which is driven by the central driving motor 14 by way of which two opposite flaps 1 on the vehicle can be actuated isochronously.

In addition to the guidance by way of the guiding levers 4, 5 applied to the lower face of the flap 1, the flap 1 has another guidance mechanism in the area of the side 9, to which the motor-driven actuator 6 is also applied. The additional guidance mechanism is formed by a link pin 15 which engages in a second vehicle-fixed link path 16. On the flap side, the link pin 15 is held on a lug 17 in the area of the side 9 of the flap 1. The vehicle-fixed second link path 16, which is situated opposite the first link path 3, has a curved course with an approximately horizontal upper section; a center section which extends steeply downward; and a lower end section which extends in a flatter fashion, the transition between the upper and the lower end section passing through a turning point. When the link pin 15 is situated on the face of the upper end section, the flap 1 is in the closed position. When the guiding pin 15 is situated on the face of the lower end section, however, the flap 1 is in the opening position.

Approximately parallel to the link path 16, a disengaging lever 19 is swivellably held on the angle plate 18—which accommodates the link path 16. The disengaging lever 19 can be adjusted about a swivelling axis which extends parallel to the rotation axis 7 of the two guiding levers 4, 5 on the flap 1, whereby the bearing point of the disengaging lever 19 is arranged at a distance from the face of the lower end section of the link path 16. On the side facing the link path 16, the disengaging lever 19 has a divided-circle-shaped receiving opening 20 into which the pin moves in its lower end position in the link path 16. Furthermore, a pressure spring 21 is provided in the section between the bearing 22 and the receiving opening for holding the disengaging lever 19 on the angle plate 18. The disengaging lever 19 is positively coupled with the angle plate 18 via the pressure spring 21 which presses the disengaging lever 19 away from the angle plate 18.

In the area of the two guiding levers 4, 5, a vehicle-fixed but rotatably disposed locking lever 23 is arranged on the side facing away from the flap 1. This locking lever 23 comprises a transmission rod 24 which bridges the distance between the two guiding levers 4, 5, as well as two lug-shaped locking elements 25, 26 in the area of the rod faces on the transmission rod 24. The transmission rod 24 extends parallel to the rotation axis 7 of the guiding levers 4, 5 on the flap 1.

The two lug-shaped locking elements 25, 26 extend radially with respect to the transmission rod 24 and, at least in the closed position of the flap 1, are in contact with the two guiding levers 4, 5. The locking element 26 faces the active guiding lever 5 resting on the projection 27 which contains the receiving device for the actuator 6; in contrast, the opposite locking element 25 is arranged below the projection 12 of the passive guiding element 4. With respect to the longitudinal axis of the transmission rod 24, the two locking elements 25, 26 extend at a different angle, i.e. are offset, both locking elements being non-rotatably connected with the transmission rod.

During the transition movement from the closed position into the opening position, the motor-driven actuator 6 is axially moved downward from its upper position by way of the common driving motor 14. In this case, the active guiding lever 5, which is firmly connected with the actuator 6, is also axially adjusted downward.

In the area of their face facing away from the vehicle flap 1, the two guiding levers 4, 5 expediently have another rotation axis which extends parallel to the flap-side axis of rotation 7. During the adjusting movement between the closed position and the opening position, the guiding levers 4, 5 swivel about both rotation axes. The active adjusting movement triggered by the actuator 6 is transmitted by way of the guiding lever 5 and the flap 1 to the passive guiding lever 4 which carries out a movement corresponding to that of the active guiding lever 5 and is guided downward in the link path 3.

At the start of the transition movement from the upper closed position into the lower opening position, the two locking elements 25, 26 at the locking lever 23 swivel downward as a result of the rotatable bearing of the transmission rod 24 and yield under the movement of the guiding levers 4, 5. To this extent, the locking elements 25, 26 represent no obstacle to the movement of the guiding levers 4, 5.

The link pin 15 which, viewed in the adjusting direction, is arranged at a distance from the bearing of the guiding levers 4, 5 on the flap 1, during the adjusting movement from the closed position into the opening position, is transferred from its face-side position in the upper end section of the second link path 16 by way of the central section into the lower end section. When approaching the lower end section of the link path 16, the link pin 15 engages in the receiving opening 20 at the disengaging lever 19, in the further course of the movement until the face of the lower end section has been reached, at which point the pressure spring 21 has been compressed and thereby potential energy absorbed. In the lower opening position, the flap 1, including the flap kinematics 2, are held by locking by way of the motor-driven actuator.

During the opposite movement from the opening position into the closed position, the actuator 6 is moved upward and the disengaging lever 19 is simultaneously swivelled toward the outside by the force of the pressure spring 21. Consequently, the link pin 15 received in the receiving opening 20 experiences an initial impulse which promotes the start of the movement from the lower end position into a detent position. In the further course, the link pin 15 disengages again from the receiving opening 20.

As soon as the active guiding lever 5 arrives in the area of its upper end position, the locking element 26 of the locking lever 23 assigned to the guiding lever 5 will rest on the projection 27 of the guiding lever 5. Simultaneously, by way of the transmission rod 24, the opposite locking element is pressed from below onto the projection 12 of the passive guiding lever 4, so that the latter is securely held in its upper end position.

By way of the described adjusting kinematics, the flap 1 can be lowered under the surrounding covering in its opening position, in this position, the flap 1 being arranged essentially parallel to the covering.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. In a vehicle having a convertible top arranged to be adjustable between a convertible top position and a deposited position, at least one flap is provided to be adjustable between a closed position, in which the flap is situated in a plane of a vehicle covering for convertible top kinematics, and an opening position comprising:

a vehicle-fixed link path on one side of the flap arranged for passive guidance of a first guiding lever connecting the flap with the vehicle, a second, actively guided guiding lever operatively arranged on another side of the flap to be acted upon by a motor-driven actuator, and a locking lever arranged between the two guiding levers such that, in the closed position of the flap, the locking lever is supported on the actively guided guiding lever and blocks movement of the passively guided guiding lever.

2. In the vehicle according to claim 1, wherein the locking lever has locking elements arranged such that, in the closed position of the flap, one of the locking elements rests on a side of the motor-driven actuator and another of the locking elements supports the passively guided guiding lever.

3. In a vehicle according to claim 1, wherein the guiding levers are articulatably arranged on the flap.

4. In a vehicle according to claim 3, wherein the guiding levers have a common rotation axis on the flap.

5. In a vehicle according to claim 1, wherein the first guiding lever is movably disposed along the link path and the second guiding lever is articulatably associated with the motor-driven actuator.

6. In a vehicle according to claim 1, wherein a second vehicle-fixed link path is spaced from the first link path and a link pin is fastened to the flap and is guided in the second link path.

7. In a vehicle according to claim 6, wherein the second link path and the first link path are arranged on opposite sides of the flaps.

8. In a vehicle according to claim 6, wherein the second link path has a curved course between relatively flat upper and lower sections.

9. In a vehicle according to claim 8, wherein the second link path and the first link path are arranged on opposite sides of the flap.

10. In a vehicle according to claim 6, wherein end sections of the second link path form detent positions for the link pin.

11. In a vehicle according to claim 6, wherein a disengaging lever is swivellably fastened on the vehicle and is arranged to supportably receive the link pin and to be spring-loaded in a direction toward the closed position of the flap.

12. In a vehicle according to claim 1, wherein, in the opening position, the flap is arranged approximately parallel to and below the covering.

13. In a vehicle according to claim 1, wherein that at least one flap is provided, on each vehicle side, and comprise the flaps arranged to share a motor drive.

* * * * *